Nov. 29, 1927.  
W. L. BEAN  
1,650,684  
LOCOMOTIVE SMOKE BOX STRUCTURE  
Filed June 2. 1925  
3 Sheets-Sheet 3
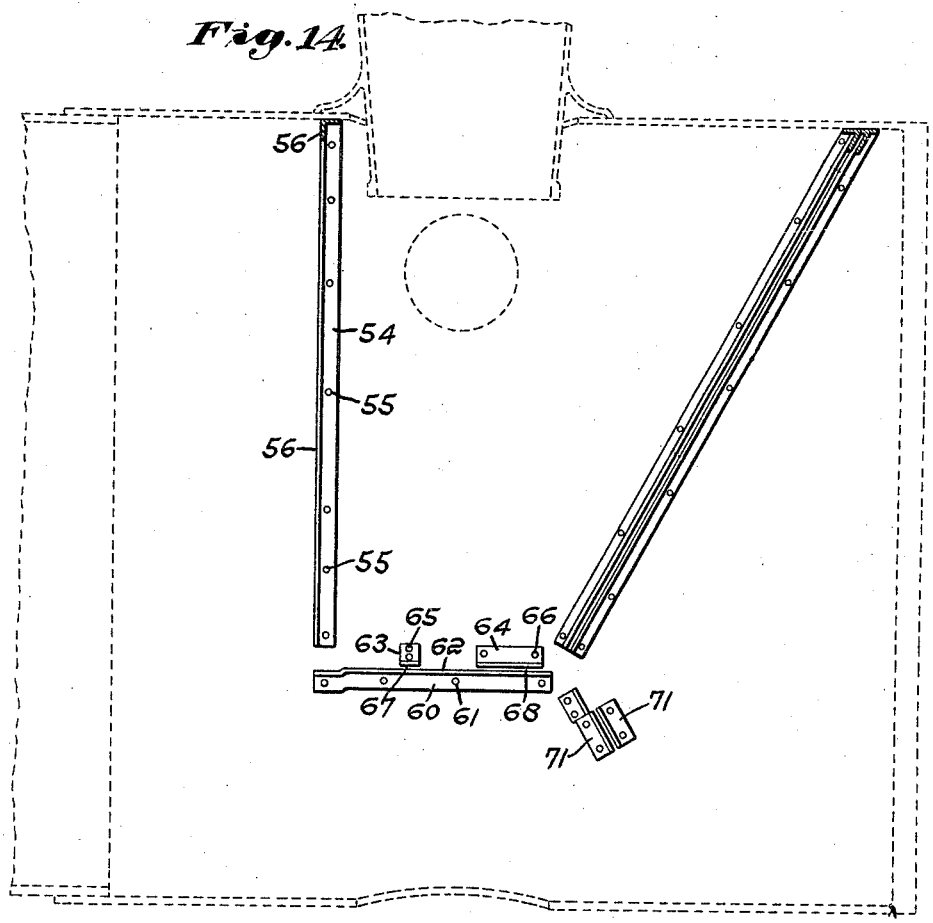
Inventor:  
William L. Bean,  
by Emery, Booth, Janney - Varney.  
Attys.

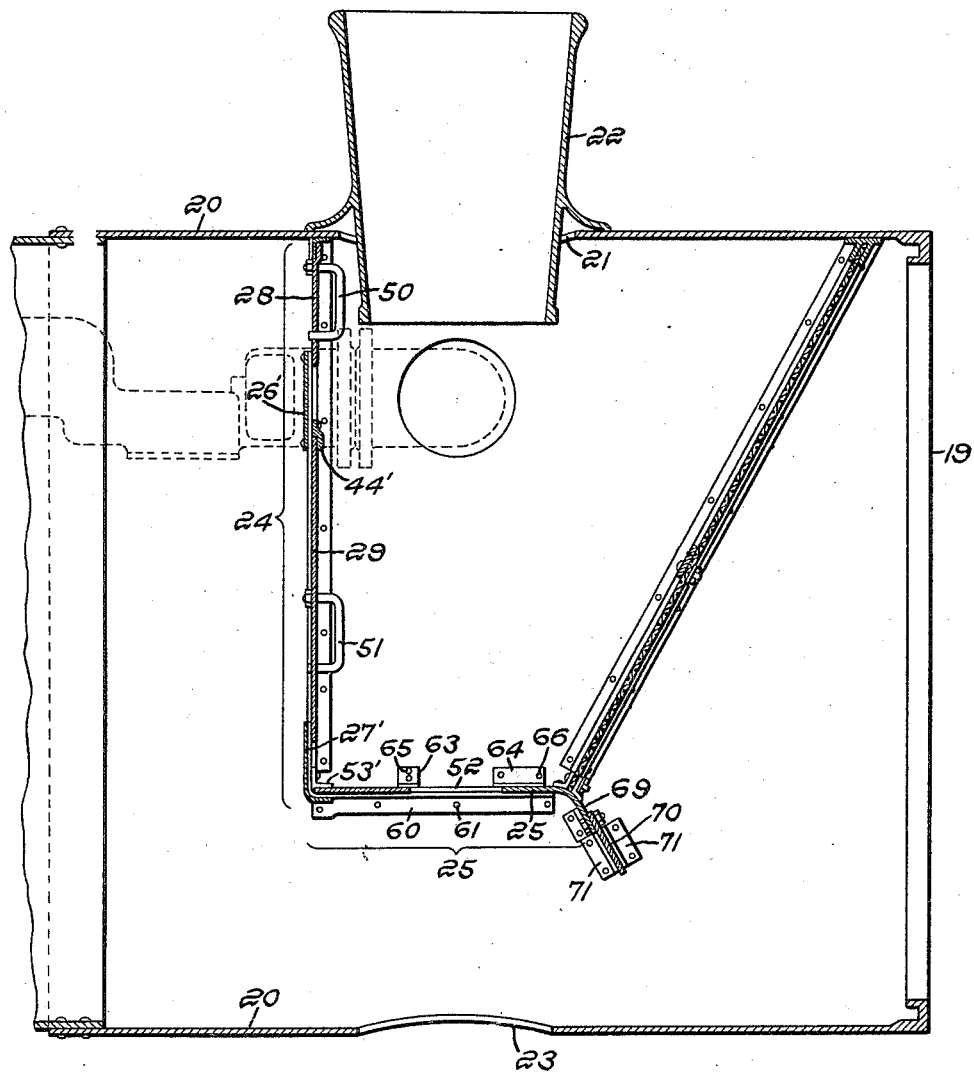

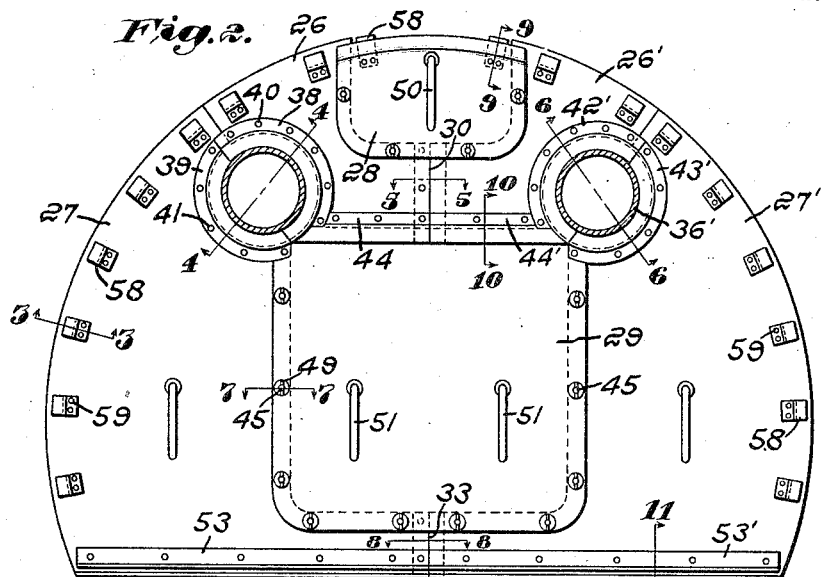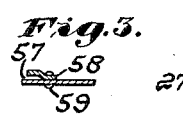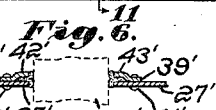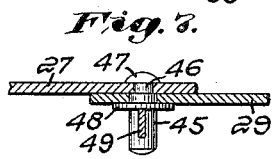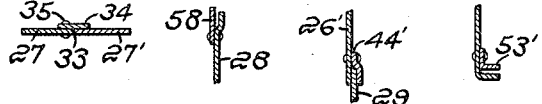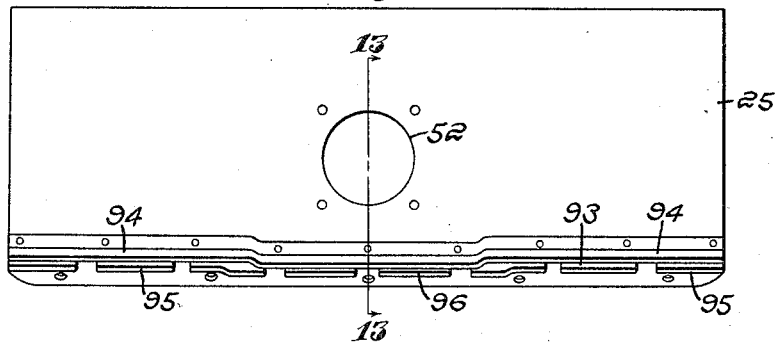

Patented Nov. 29, 1927.

1,650,684

UNITED STATES PATENT OFFICE.

WILLIAM L. BEAN, OF WEST HAVEN, CONNECTICUT.

LOCOMOTIVE-SMOKE-BOX STRUCTURE.

Application filed June 2, 1925. Serial No. 34,406.

This invention relates to locomotive smoke-box structures and has particular reference to novel features relating to deflectors.

The invention will be best understood by reference to the following description, when taken in connection with the accompanying drawings of one specific embodiment thereof, while its scope will be more particularly pointed out in the appended claims.

In the drawings:

Fig. 1 is a longitudinal, vertical, sectional view of a locomotive smoke-box structure exemplifying the invention;

Fig. 2 is a front elevation of a portion of the deflector;

Fig. 3 is a sectional view on line 3—3 of Fig. 2;

Fig. 4 is a sectional view on line 4—4 of Fig. 2;

Fig. 5 is a sectional view on line 5—5 of Fig. 2;

Fig. 6 is a sectional view on line 6—6 of Fig. 2;

Fig. 7 is a sectional view, on an enlarged scale, on line 7—7 of Fig. 2;

Fig. 8 is a sectional view, on line 8—8 of Fig. 2;

Fig. 9 is a sectional view on line 9—9 of Fig. 2;

Fig. 10 is a sectional view on line 10—10 of Fig. 2;

Fig. 11 is a sectional view on line 11—11 of Fig. 2;

Fig. 12 is a plan of another portion of the deflector;

Fig. 13 is a sectional view on line 13—13 of Fig. 12;

Fig. 14 is a skeletonized view, illustrating the supports for the deflector and the spark netting.

Referring to the drawings, and to the embodiment of the invention which is selected for exemplification, and having reference at first more particularly to Fig. 1, the smoke-box structure comprises a smoke-box 19 having a circumferential wall 20, which has in its upper portion an opening 21 for a usual stack 22, and in its lower portion an opening 23 for a usual exhaust pipe (not shown), the exhaust from which herein is directed upward into and through the stack, and thereby induces a draft in a well-known manner. The deflector, which deflects the gases in a downward direction, and compels them to flow first to the forward end of the smoke-box and thence in an upward and rearward direction through the spark netting into the path of the exhaust steam toward the stack, will now be described, reference being had at first to Fig. 1.

The deflector comprises a rear, generally upright portion designated generally by the numeral 24, and a lower, generally horizontal portion designated generally by the numeral 25. Referring now to Fig. 2, the rear portion of the deflector comprises upper left and right plates 26 and 26', lower left and right plates 27 and 27', an upper inspection plate 28, and a lower inspection plate 29. Herein, the plates 26 and 26' abut against each other along a line 30, and to ensure a tight joint at that point, there is secured to the adjacent margin of the plate 26 (see Fig. 5) a narrow strip or plate 31, which overlies the margins of the plates 26 and 26', it being conveniently secured to the former as by rivets 32. Thus there is provided a joint which prevents sparks from passing through, even though the plates should become warped to quite an extent. Similarly, the plates 27 and 27' abut against each other along a line 33, and secured to an adjacent margin of the plate 27 (see Fig. 8) is a narrow plate or strip 34, which overlies the adjacent margins of both plates 27 and 27', and is conveniently secured to the former, as by rivets 35.

The plates 26 and 27 are secured to each other about a pipe, herein a superheater pipe 36, and the plates 26' and 27' are joined to each other about another pipe, herein a superheater pipe 36', and to prevent leakage of gases at these points, there are provided packings 37 and 37' (see Figs. 4 and 6). Secured to the margins of the plates 26 and 27 are strips or plates 38 and 39, as by rivets 40 and 41. These plates are provided with offset portions 42 and 43, which, together with the adjacent margins of the plates 26 and 27, present grooves to receive the packing 37. Similarly, plates 38' and 39' are secured to the plates 26' and 27', by rivets 40' and 41', and the plates 38' and 39' have offset portions 42' and 43', which, together with the margins of the plates 26' and 27', present grooves for the packing 37'. Similarly, there are secured to the lower margins of the plates 26 and 26' narrow strips or plates 44 and 44', which are offset (see Fig. 10) to provide grooves to receive the upper edge of the inspection plate 29.

The inspection plate 29 may be conveniently secured in place by a series of fastening elements, one of which is illustrated in Fig. 7. In the present example, the fastening element is a pin 45, which is permanently secured to the plate 27, or 27' as the case may be, as by having a reduced portion 46, which extends through the plate, and is riveted or headed over at 47. The body of the pin extends through the inspection plate 29, and receives at the front face of the latter a washer 48, conveniently held in place by a split locking key 49, which extends through the pin. Like fastening elements are employed for the upper inspection plate. These inspection plates may be provided with appropriate handles 50 and 51 (see Fig. 2).

The lower portion 25 of the deflector will now be described, reference being had at first to Fig. 12. In this example, this portion of the deflector comprises a single plate presenting an opening 52 to receive the exhaust pipe. The rear edge of the plate 25 is received in a groove presented by adjacent marginal portions of the plates 27 and 27', and flanges presented by angle portions 53 and 53' (see Fig. 2), secured to the plates 27 and 27', respectively.

The supports for the deflector will now be described, reference being had at first to Fig. 14. The rear deflector, which it will be remembered is composed of the plates 26, 26', 27 and 27', has a circular margin, which is attached to the circumferential wall of the smoke-box by appropriate interengaging means, herein including a circumferential bar 54. In the present example, this bar is appropriately secured to the smoke-box wall as by rivets 55, and has tongue and groove connection with the deflector, as by providing the bar with an inwardly directed flange 56, which is received in a groove, or rather a succession of grooves, 57 (see Fig. 3), presented by a series of brackets 58, which are appropriately secured to the deflector plates, as by rivets 59. This interengagement of the deflector and the smoke-box enables the several plates composing the deflector to be put in place and securely held, without the necessity of employing any fastening elements, such as bolts or the like. It follows that the removal of the deflector plates can be accomplished with great facility. The several plates which compose the rear portion of the deflector are put in place by first introducing the lower left-hand plate 27, then the lower right-hand plate 27', then the upper left-hand plate 26, then the upper right-hand plate 26', and finally the inspection plates 28 and 29, which, by the way, lock the others in place.

Referring again to Fig. 14, the front deflector plate 25 is conveniently supported at both ends by bars 60, suitably secured to the circumferential wall of the smoke-box as by rivets 61, said bars presenting inwardly directed flanges 62 on which the plate rests. Upward movement of the plate is conveniently prevented by brackets 63 and 64, secured to the circumferential walls of the smoke-box as by rivets 65 and 66, said brackets being provided with inwardly directed flanges 67 and 68, which, together with the flanges 62, present a groove or grooves into which the edges of the plate 25 may be introduced by sliding the same in a rearward direction. Herein, the plate 25 has a depending portion 69 (see Fig. 1), to which is secured a damper plate 70, conveniently supported by grooves presented by brackets 71, similar to those just described.

Having thus described one embodiment of the invention, but without limiting myself thereto, what I claim and desire to secure by Letters Patent is:

1. In a smoke-box structure, the combination of a smoke-box having a circumferential wall, a deflector within said smoke-box, and means presenting an interengaging connection between said deflector and said wall, said means including a circumferential bar secured to said circumferential wall, and presenting a tongue, and said deflector presenting a groove which receives said tongue, said deflector comprising a plurality of sections enabling the same to be dismounted by withdrawing said tongue from said groove.

2. In a smoke-box structure, the combination of a smoke-box having a circumferential wall, a deflector within said smoke-box, and means presenting an interengaging connection between said deflector and said wall, said means including a circumferential bar secured to said circumferential wall, and presenting an inwardly directed flange, and parts presented by said deflector and receiving said flange between them.

3. In a smoke-box structure, the combination of a smoke-box having a circumferential wall, a stack, a deflector within said smoke-box to deflect the gases downward toward the bottom of said smoke-box on their way to said stack, and means presenting a tongue and groove connection between said deflector and said wall, said means including a circumferential bar secured to said circumferential wall and presenting one of the parts of said connection, said deflector comprising a plurality of sections enabling the same to be dismounted by withdrawing the tongue and groove one from the other.

4. In a smoke-box structure, the combination of a smoke-box having a circumferential wall, a deflector within said smoke-box, and means presenting a tongue and groove connection between said deflector and said wall, said means including a bar secured to said wall and presenting a tongue and means secured to said deflector and presenting therewith parts between which said tongue is received.

5. In a smoke-box structure, the combination of a smoke-box having a circumferential wall, a deflector within said smoke-box, and means presenting a tongue and groove connection between said deflector and said wall, said means including a bar secured to said wall and presenting a tongue, and a series of brackets secured to said deflector and presenting therewith a series of grooves which receive said tongue.

6. In a smoke-box structure, the combination of a smoke-box, a deflector therein comprising a generally vertical portion and a generally horizontal portion, said portions together constituting a continuous wall, and means presenting a tongue and groove connection between the lower edge of said vertical portion and the rear edge of said horizontal portion, said means including a part secured to one of said portions and presenting therewith a groove, the adjacent edge of the other portion being received in said groove.

In testimony whereof, I have signed my name to this specification.

WILLIAM L. BEAN.